US 10,663,184 B2

(12) United States Patent
Park et al.

(10) Patent No.: US 10,663,184 B2
(45) Date of Patent: May 26, 2020

(54) AIR CONDITIONER AND CONTROL METHOD THEREFOR

(71) Applicant: LG ELECTRONICS INC., Seoul (KR)

(72) Inventors: Jungmin Park, Seoul (KR); Hamin Jeon, Seoul (KR); Howon Son, Seoul (KR); Heejae Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 220 days.

(21) Appl. No.: 15/508,673

(22) PCT Filed: Sep. 4, 2015

(86) PCT No.: PCT/KR2015/009384
§ 371 (c)(1),
(2) Date: Mar. 3, 2017

(87) PCT Pub. No.: WO2016/036211
PCT Pub. Date: Mar. 10, 2016

(65) Prior Publication Data
US 2017/0284694 A1     Oct. 5, 2017

(30) Foreign Application Priority Data
Sep. 4, 2014   (KR) .......................... 10-2014-0117602

(51) Int. Cl.
*F24F 11/39*     (2018.01)
*G08B 21/00*    (2006.01)
(Continued)

(52) U.S. Cl.
CPC ............ *F24F 11/30* (2018.01); *B01D 46/008* (2013.01); *B01D 46/0023* (2013.01);
(Continued)

(58) Field of Classification Search
CPC ...... G08B 21/00; G08B 29/145; G08B 17/10; B01D 46/442; B01D 46/0086;
(Continued)

(56) References Cited

U.S. PATENT DOCUMENTS 4,168,438 A * 9/1979 Morisue ............... G08B 17/113
                                                   250/574
4,524,351 A * 6/1985 Kimura .................. G01N 27/66
                                                   250/384
(Continued)

FOREIGN PATENT DOCUMENTS

CN      1719123       1/2006
CN      1948840       4/2007
(Continued)

OTHER PUBLICATIONS

International Search Report (with English Translation) and Written Opinion dated Feb. 4, 2016 issued in Application No. PCT/KR2015/009384.

(Continued)

*Primary Examiner* — Minh Chau T Pham
(74) *Attorney, Agent, or Firm* — KED & Associates LLP

(57) ABSTRACT

An air conditioner including a first filter; a second filter located downstream of the first filter; a dust amount sensor located upstream of the first filter and having a hole through which dust passes, the dust amount sensor configured to transmit, per unit of time, each of a first total, which is an amount of dust in a first size range, and a second total, which is an amount of dust in a second size range smaller than the first size range, of the dust passing through the hole; and a controller configured to output a service signal for the first filter if the accumulated value of the first total transmitted from the dust amount sensor exceeds a first set value, and output a service signal for the second filter if the accumu- (Continued)

lated value of the second total transmitted from the dust amount sensor exceeds a second set value.

15 Claims, 5 Drawing Sheets

(51) Int. Cl.
| | |
|---|---|
| *G08B 17/10* | (2006.01) |
| *F24F 11/30* | (2018.01) |
| *F24F 11/89* | (2018.01) |
| *F24F 13/28* | (2006.01) |
| *B01D 46/44* | (2006.01) |
| *B01D 46/00* | (2006.01) |
| *F24F 1/0007* | (2019.01) |
| *F24F 110/64* | (2018.01) |
| *F24F 110/50* | (2018.01) |
| *F24F 110/60* | (2018.01) |

(52) U.S. Cl.
CPC ....... *B01D 46/0086* (2013.01); *B01D 46/442* (2013.01); *F24F 1/0007* (2013.01); *F24F 11/89* (2018.01); *F24F 13/28* (2013.01); *B01D 2279/50* (2013.01); *F24F 11/39* (2018.01); *F24F 2110/50* (2018.01); *F24F 2110/60* (2018.01); *F24F 2110/64* (2018.01)

(58) Field of Classification Search
CPC .............. B01D 46/0023; B01D 46/008; B01D 2279/50; F24F 2110/60; F24F 2110/64; F24F 2110/50; F24F 11/39
USPC ................. 340/607, 609; 250/222.2; 702/23; 55/385.1, DIG. 34
See application file for complete search history.

(56) References Cited

U.S. PATENT DOCUMENTS

| | | | | |
|---|---|---|---|---|
| 5,244,480 | A | | 9/1993 | Henry |
| 5,606,311 | A | * | 2/1997 | Polidan .............. B01D 46/0086 340/607 |
| 5,821,865 | A | * | 10/1998 | Solak ................. A47G 33/0872 340/628 |
| 6,052,058 | A | * | 4/2000 | Knox ..................... G01N 21/53 340/607 |
| 6,660,070 | B2 | * | 12/2003 | Chung ................. B01D 46/008 96/424 |
| 7,749,303 | B2 | * | 7/2010 | Wright ............... B01D 53/0454 55/DIG. 34 |
| 8,314,710 | B2 | * | 11/2012 | Knox ................... G08B 29/145 250/222.2 |
| 2006/0187070 | A1 | | 8/2006 | Liang et al. |
| 2007/0181000 | A1 | | 8/2007 | Wilson et al. |
| 2010/0305871 | A1 | | 12/2010 | Knox et al. |

FOREIGN PATENT DOCUMENTS

| | | |
|---|---|---|
| CN | 101165417 | 4/2008 |
| CN | 203203159 | 9/2013 |
| CN | 104006459 | 8/2014 |
| JP | 09-86158 | 3/1997 |
| JP | 2011112283 | 6/2011 |
| KR | 10-2010-0012663 | 2/2010 |
| KR | 10-2010-0016775 | 2/2010 |
| KR | 10-2010-0069918 | 6/2010 |
| KR | 10-2013-0030795 | 3/2013 |
| KR | 10-2013-0106317 | 9/2013 |

OTHER PUBLICATIONS

Chinese Office Action dated Mar. 1, 2019.
European Search Report dated Apr. 26, 2018.

* cited by examiner

AIR CONDITIONER AND CONTROL METHOD THEREFOR

CROSS-REFERENCE TO RELATED PATENT APPLICATIONS

This application is a U.S. National Stage Application under 35 U.S.C. § 371 of PCT Application No. PCT/KR2015/009384, filed Sep. 4, 2015, which claims priority to Korean Patent Application No. 10-2014-0117602, filed Sep. 4, 2014, whose entire disclosures are hereby incorporated by reference.

TECHNICAL FIELD

The present invention relates to an air conditioner and a control method therefor, and more particularly, to an air conditioner, which determines and announces the optimum service time of each of a plurality of filters, and a control method therefor.

BACKGROUND ART

In general, an air conditioner is an apparatus that suctions air, performs conditioning of the air, and discharges the conditioned air. Inside the apparatus, an air conditioning unit having air-conditioning, air-cooling, air-heating, and humidification functions is accommodated to maintain a pleasant room.

Such an air conditioner serves to change at least one of the temperature, humidity, and cleanliness of a room. Various types of purification units may be installed in the air conditioner.

In the air conditioner, a filter that filters impurities in air is attachably or detachably installed. When the air conditioner is operated, the impurities in the air are caught by the filter so that a room is purified. The filter may be separated for cleaning or replacement.

The filter described above needs to be periodically cleaned or replaced because it may deteriorate air suction ability when a great amount of impurities accumulate thereon. Thus, when the optimum service time of the filter is announced, a user may maintain the filter in the optimum state, and the air conditioner may discharge purified air into a room.

DISCLOSURE

Technical Problem

A conventional method of announcing the replacement time of a filter has no ability to determine and announce the optimum service time of each of a plurality of filters in the case of an air conditioner in which the filters are arranged in multiple layers in the airflow direction.

Technical Solution

To achieve the above described object, in accordance with one aspect of the present invention, there is provided an air conditioner including a first filter, a second filter located downstream of the first filter in an airflow direction, a dust amount sensor located upstream of the first filter in the airflow direction and formed with a hole for passage of dust, the dust amount sensor being configured to transmit, per unit of time, each of a first total amount of dust within a first particle size range and a second total amount of dust within a second particle size range, which is smaller than the first particle size range, among all of the dust passing through the hole, and a controller configured to output a service signal of the first filter when an accumulated value of the first total amount transmitted from the dust amount sensor exceeds a first set value and to output a service signal for the second filter when an accumulated value of the second total amount transmitted from the dust amount sensor exceeds a second set value.

The dust amount sensor may be configured to emit light into the hole, measure the amount of dust within the first particle size range based on a pattern of light scattered by the dust within the first particle size range, and measure the amount of dust within the second particle size range based on a pattern of light scattered by the dust within the second particle size range.

The air conditioner may further include an alarm device configured to receive the signal from the controller and to prompt for service of at least one of the first filter and the second filter.

The alarm device may include a display installed in the air conditioner, and the display may independently display information about each of service of the first filter and service of the second filter.

The air conditioner may further include a communication unit configured to receive the signal from the controller and to transmit the service signal for the first filter and the service signal for the second filter to an external device.

The air conditioner may further include a third filter located between the first filter and the second filter, and an odor sensor configured to sense a concentration of odor particles in air and to transmit a third total concentration amount of the odor particles to the controller per unit of time, and the controller may output a service signal for the third filter when an accumulated third total concentration amount exceeds a third set value.

The air conditioner may further include an alarm device configured to receive the signal from the controller and to prompt for service of the third filter.

In accordance with another aspect of the present invention, there is provided a control method of controlling an air conditioner including a first filter, a second filter located downstream of the first filter in an airflow direction, and a dust amount sensor located upstream of the first filter in the airflow direction, the control method including a first step of transmitting, per unit of time, each of a first total amount of dust within a first particle size range and a second total amount of dust within a second particle size range, which is smaller than the first particle size range, among all of dust passing through a hole formed in the dust amount sensor, and a second step of outputting a service signal for the first filter when an accumulated first total amount value exceeds a first set value and outputting a service signal for the second filter when an accumulated second total amount value exceeds a second set value.

The first step may include emitting light into the hole, measuring the amount of dust within the first particle size range based on a pattern of light scattered by the dust within the first particle size range, and measuring the amount of dust within the second particle size range based on a pattern of light scattered by the dust within the second particle size range.

The control method may further include a third step of prompting outwards for service based on the service signal for the filter output in the second step.

The third step may include displaying information about service of the filter, in which the accumulated total amount value of dust exceeds the set value, via a display installed in the air conditioner.

The third step may include transmitting the service signal for the first filter or the service signal for the second filter to an external device.

Advantageous Effects

According to the present invention, the optimum service time of each of a first filter and a second filter, which may filter dust of different particle sizes, may be independently calculated. Thereby, it is possible to prevent any one of the first filter and the second filter from being unnecessarily serviced and to announce the optimum service time depending on the quality of indoor air.

BEST MODE

Hereinafter, the embodiments of the present invention will be described in detail with reference to the accompanying drawings.

Figure 1:
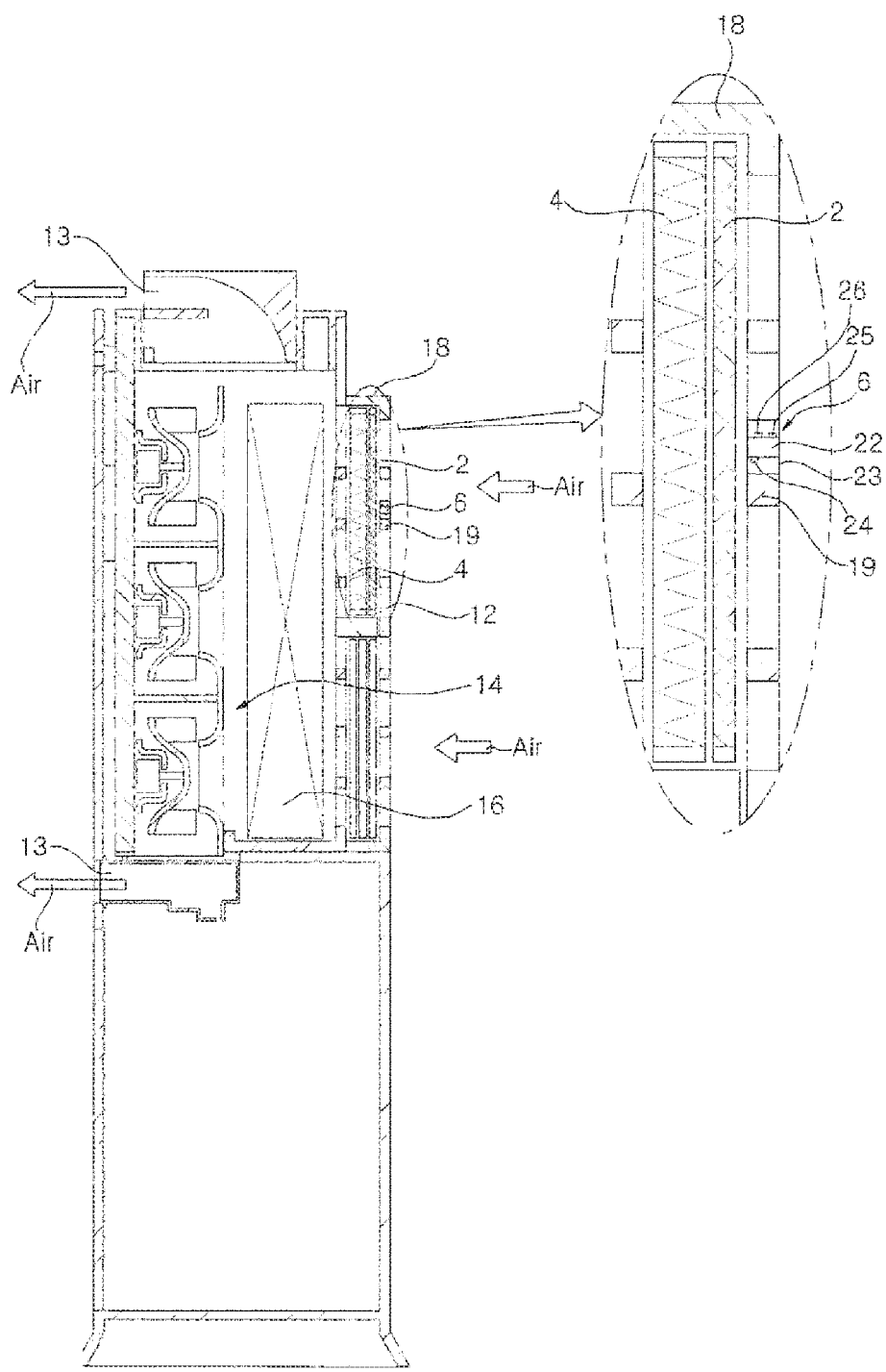
FIG. 1 is a view illustrating a configuration of an air conditioner according to an embodiment of the present invention.
Figure 2:
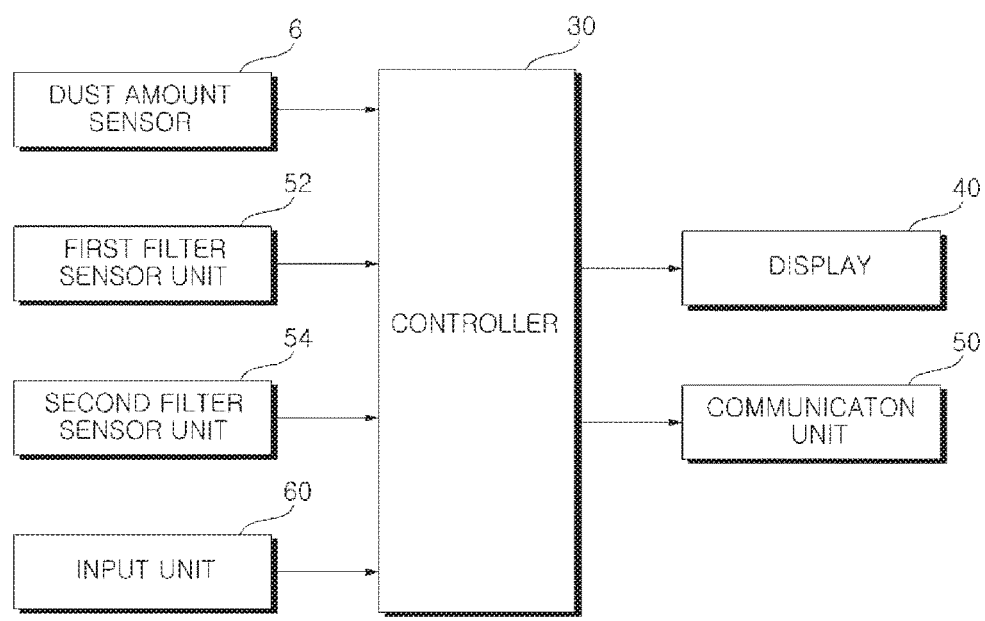
FIG. 2 is a control block diagram of the air conditioner according to the embodiment of the present invention.

FIG. 1 is a view illustrating a configuration of an air conditioner according to an embodiment of the present invention, and FIG. 2 is a control block diagram of the air conditioner according to the embodiment of the present invention.

The air conditioner may include a first filter 2, and a second filter 4 located downstream of the first filter 2 in the airflow direction. The air conditioner may include a dust amount sensor 6 located upstream of the first filter 2 in the airflow direction.

The first filter 2 and the second filter 4 may filter dust of different particles sizes. The first filter 2 may be a filter that may filter dust having a relatively large particle size, and the second filter 4 may be a filter that may filter dust having a relatively small particle size. The second filter 4 may be a filter that may filter fine dust having a particle size of 10 μm or less.

The first filter 2 may be a pre-filter that may filter coarse dust at a position upstream of the second filter 4, and the second filter 4 may be a high-performance filter, such as a high frequency particulate arrestance (HEPA) filter, that may filter fine dust having a particle size of 10 μm or less.

The air conditioner may be a cooler or a combined cooling and heating appliance that includes the first filter 2 and the second filter 4 and is provided with a heat exchanger, through which a coolant passes. The air conditioner may be an air purifier that includes the first filter 2 and the second filter 4 without a heat exchanger, serving only to purify indoor air. The air conditioner may be a dehumidifier that includes the first filter 2 and the second filter 4 and further includes a dehumidification unit to remove moisture from indoor air so as to discharge dehumidified and purified air into a room. The air conditioner may be a humidifier that includes the first filter 2 and the second filter 4 and further includes a humidification unit to humidify indoor air so as to discharge humidified and purified air into a room.

The air conditioner may be provided with an air suction port 12, through which indoor air may be suctioned into the air conditioner, and the first filter 2 and the second filter 4 may be sequentially arranged in the air suction direction at the side of the air suction port 12, regardless of the type of the air conditioner. The first filter 2 and the second filter 4 may be located upstream of the air suction port 12 in the air suction direction so as to sequentially purify the air to be suctioned toward the air suction port 12. The first filter 2 and the second filter 4 may be located in the air suction port 12 in the air suction direction so as to sequentially purify the air. The filter 2 and the second filter 4 may be located downstream of the air suction port 12 in the air suction direction so as to purify the air, suctioned into the air conditioner through the air suction port 12, inside the air conditioner. The air conditioner may be provided with an air discharge port 13, through which the air, which has been treated inside the air conditioner, is discharged to the outside of the air conditioner, regardless of the type of the air conditioner.

In the case where the air conditioner is configured as a combined air-purification and cooling appliance that may purify air and cool a room, the air conditioner may include a blower 14, and may further include a heat exchanger 16 that performs heat exchange between the coolant and the air. In the case where the air conditioner is configured as a combined air-purification and heating appliance that may purify air and heat a room, the air conditioner may include the blower 14, and may further include at least one of the heat exchanger 16 that performs heat exchange between the coolant and the air and a heater (not illustrated) that generates heat using electricity and heats the air. The air conditioner may further include a filter guide 18, to which the first filter 2 and the second filter 4 are attachably or detachably coupled. The filter guide 18 may be formed with a suction grill 19, through which air passes, and a hole in the suction grill 19 may be the air suction port 12.

The dust amount sensor 6 may be located upstream of the first filter 2 in the airflow direction, and may sense the amount of dust in the air that flows toward the first filter 2 and the second filter 4. The dust amount sensor 6 may be provided with a hole 22, through which dust passes. The dust amount sensor 6 may include a sensor body 23 having the hole 22 formed therein. The sensor body 23 may be mounted to the filter guide 18, and may be located to occupy a region of the air suction port 12 formed in the filter guide 18.

The dust amount sensor 6 may transmit, per unit of time, a first total amount of dust within a first particle size range and a second total amount of dust within a second particle size range, which is smaller than the first particle size range, among all of the dust passing through the hole 22.

The dust amount sensor 6 may be a single sensor that may sort dust of different particle sizes, and may output signals having different magnitudes depending on the particle sizes of the dust.

The dust amount sensor 6 may be a dust sensor. Specifically, the dust amount sensor 6 may be an optical dust sensor that includes a light-emitting element 24 and one or more light-receiving elements 25 and 26.

The light-emitting element 24 may be a light source that may emit light to the hole 22. The light-emitting element 14 may be a light-emitting diode.

In the dust amount sensor 6, the light, emitted from the light-emitting element 24 to the hole 22, may be differently scattered depending on the particle size of the dust, and the light-receiving elements 25 and 26 may receive the light, which has been emitted from the light-emitting element 24 and scattered by the dust. The light-receiving elements 25 and 26 may include a first light-receiving element 25 that detects light scattered by coarse dust, and a second light-receiving element 26 that detects light scattered by fine dust.

The dust amount sensor 6 may measure the amount of dust within the first particle size range by detecting scattered light based on the pattern of the light scattered by the coarse dust within the first particle size range, and may transmit the first total amount of dust measured during a predetermined amount of time. Here, the first particle size range may be set to dust having a particle size above 10 μm, which is introduced into the hole 22.

The dust amount sensor 6 may measure the amount of dust within the second particle size range by detecting scattered light based on the pattern of the light scattered by fine dust within the second particle size range, and may transmit the second total amount of dust measured during a predetermined amount of time. Here, the second particle size range may be set to dust having a particle size below 10 μm, which is introduced into the hole 22.

The dust amount sensor 6 may transmit, per unit of time, both the first total amount and the second total amount to a controller 30, which will be described later. Here, the unit of time may be a set duration of operation of the air conditioner, and for example, may be 10 seconds or 1 minute.

The air conditioner may include the controller 30, which outputs a service signal for the first filter 2 or a service signal for the second filter 4 depending on a signal transmitted from the dust amount sensor 6.

The controller 30 may output the service signal for the first filter when the accumulated value of the first total amount transmitted from the dust amount sensor 6 exceeds a first set value.

The controller 30 may output the service signal for the second filter when the accumulated value of the second total amount transmitted from the dust amount sensor 6 exceeds a second set value.

The air conditioner may further include an alarm device, which receives the signal from the controller 30 and prompts for the service of at least one of the first filter 2 and the second filter 4. The alarm device may include a display 40 installed in the air conditioner. In some embodiments, the alarm device may include a speaker (not illustrated) installed in the air conditioner. The display 40 may independently display information about the service of the first filter 2 and the service of the second filter 2.

The air conditioner may further include a communication unit 50, which receives the signal from the controller 30 and transmits the service signal for the first filter 2 and the service signal for the second filter 4 to an external device. Here, of course, the external device may be a device that enables easy user information checking, such as a portable terminal, that enables the direct transmission of the service signal for the first filter 2 and the service signal for the second filter 4 from the communication unit 50, and that enables the transmission of the service signal for the first filter 2 and the service signal for the second filter 4 via a separate network, such as the Internet network.

The air conditioner may further include a first filter sensor unit 52, which may sense the mounting and separation of the first filter 2, and a second filter sensor unit 54, which may sense the mounting and separation of the second filter 4.

The first filter sensor unit 52 may output a signal depending on the mounting and separation of the first filter 2 to the controller 30. The first filter sensor unit 52 may include a switching element, which is switched on when the first filter 2 is mounted and is switched off when the first filter 2 is separated. The controller 30 may judge that the service of the first filter 2 is completed when the first filter sensor unit 52 senses the mounting of the first filter 2 after sensing the separation of the first filter 2.

The second filter sensor unit 54 may output a signal depending on the mounting and separation of the second filter 4 to the controller 30. The second filter sensor unit 54 may include a switching element, which is switched on when the second filter 4 is mounted and is switched off when the second filter 4 is separated. The controller 30 may judge that the service of the second filter 4 is completed when the second filter sensor unit 54 senses the mounting of the second filter 4 after sensing the separation of the second filter 4.

The controller 30 may reset the accumulated first total amount value to zero when judging that the service of the first filter 2 is completed via the first filter sensor unit 52. The controller 30 may reset the accumulated second total amount value to zero when judging that the service of the second filter 4 is completed via the second filter sensor unit 54.

The air conditioner may further include an input unit 60, which may allow the user to indicate the completion of service of the first filter 2 and the completion of service of the second filter 4. The input unit 60 may be configured to input the completion of service of the first filter 2 and the completion of service of the second filter 4 respectively. The input unit 60 may include a first key, which may be used to indicate the completion of service of the first filter 2, and a second key, which may be used to indicate the completion of service of the second filter 4.

The user may input information indicating that the service of the first filter 2 is completed via the input unit 60, and the controller 30 may reset the accumulated first total amount value to zero when information indicating the completion of service of the first filter 2 is input via the input unit 60.

The user may input information indicating that the service of the second filter 4 is completed via the input unit 60, and the controller 30 may reset the accumulated second total amount value to zero when information indicating the completion of service of the second filter 4 is input via the input unit 60.

Figure 3:
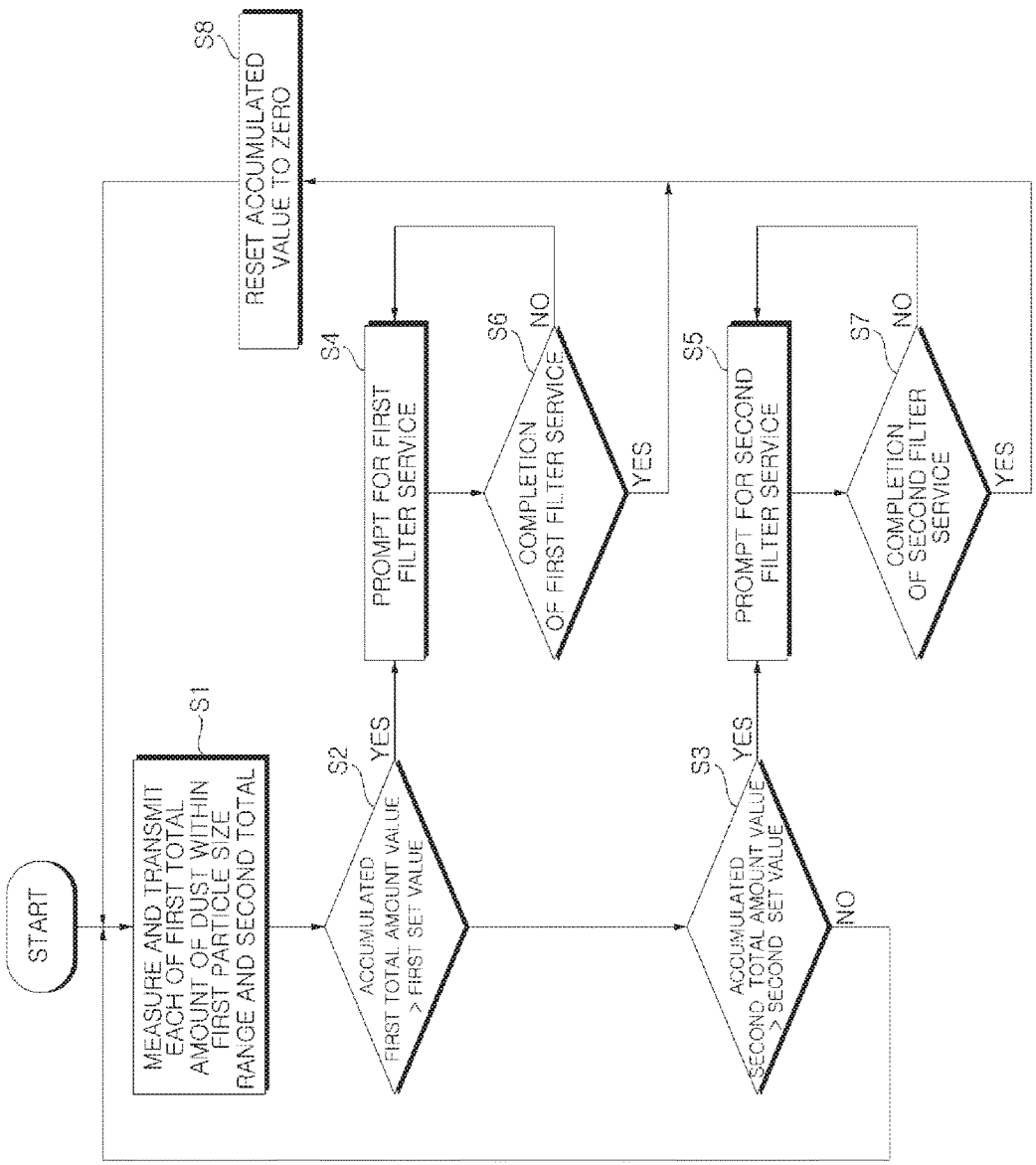
FIG. 3 is a flowchart illustrating a control method for the air conditioner according to the embodiment of the present invention.

FIG. 3 is a flowchart illustrating a control method for the air conditioner according to the embodiment of the present invention.

The control method for the air conditioner may control the air conditioner, which includes the first filter 2, the second filter 4 located downstream of the first filter 2 in the airflow direction, and the dust amount sensor 6 installed upstream of the first filter 2 in the airflow direction.

The control method for the air conditioner may include a first step S1 of transmitting, per unit of time, each of the total amount of dust within a first particle size range among all of the dust passing through the hole 22 formed in the dust amount sensor 6, and the total amount of dust within a second particle size range among all of the dust passing through the hole 22.

In the first step S1, the dust amount sensor 6 may emit light to the hole 22.

In the first step S1, the dust amount sensor 6 may measure the amount of dust within the first particle size range for a predetermined amount of time based on the pattern of light scattered by the dust within the first particle size range, and may transmit a first signal, which corresponds to the first total amount of dust measured per unit of time, to the controller 30.

In the first step S1, the dust amount sensor 6 may measure the amount of dust within the second particle size range for a predetermined amount of time based on the pattern of light scattered by the dust within the second particle size range, and may transmit a second signal, which corresponds to the second total amount of dust measured per unit of time, to the controller 30.

The dust amount sensor 6 may transmit the first signal and the second signal to the controller 30 at intervals.

The control method for the air conditioner may include a second step S2 and S3 of outputting a service signal for the first filter 2 when the accumulated value of the first total amount transmitted from the dust amount sensor 6 exceeds a first set value and of outputting a service signal for the second filter 4 when the accumulated value of the second total amount transmitted from the dust amount sensor 6 exceeds a second set value.

The controller 30 may calculate the accumulated value of the first total amount transmitted per unit of time. The controller 30 may not output the service signal for the first filter 2 before the accumulated first total amount value exceeds the first set value, and may output the service signal for the first filter 2 when the accumulated first total amount value exceeds the first set value (S2).

The controller 30 may calculate the accumulated value of the second total amount transmitted per unit of time. The controller 30 may not output the service signal for the second filter 4 before the accumulated second total amount value exceeds the second set value, and may output the service signal for the second filter 4 when the accumulated second total amount value exceeds the second set value (S3).

The control method for the air conditioner may further include a third step S4 and S5, which prompts outwards for service based on the service signal for the filter output from the second step S2 and S3. In the third step S4 and S5, the display 40 installed in the air conditioner may display the service of the filter in which the accumulated total amount value of dust exceeds the set value. In the third step S4 and S5, the service signal for the first filter and the service signal for the second filter may be transmitted to an external device. In addition, in some embodiments, in the third step S4 and S5, the speaker (not illustrated) installed in the air conditioner may acoustically prompt for the service of the filter in which the accumulated total amount value of dust exceeds the set value.

When the controller 30 outputs the service signal for the first filter 2, the display 40 may display information that prompts for the cleaning or replacement of the first filter 2 via symbols, characters, and the like based on the service signal for the first filter 2 output from the controller 30 (S4).

When the controller 30 outputs the service signal for the first filter 2, the communication unit 50 may transmit the service signal for the first filter 2, output from the controller 30, to an external device, and the external device may display information that prompts for the cleaning or replacement of the first filter 2 via symbols, characters, and the like based on the signal (S4).

When the controller 30 outputs the service signal for the second filter 4, the display 40 may display information that prompts for the cleaning or replacement of the second filter 4 via symbols, characters, and the like based on the service signal for the second filter 4 output from the controller 30 (S5).

When the controller 30 outputs the service signal for the second filter 4, the communication unit 50 may transmit the service signal for the second filter 4, output from the controller 30, to an external device, and the external device may display information that prompts for the cleaning or replacement of the second filter 4 via symbols, characters, and the like based on the signal (S5).

Meanwhile, the control method for the air conditioner may reset the accumulated value to zero when the service of the filter, from which the service information is output, is completed, and may return to the first step S1.

The control method for the air conditioner may reset the accumulated first total amount value to zero when the first filter sensor unit 52 senses the completion of service of the first filter 2, or when the completion of service of the first filter 2 is input via the input unit 60, and may return to the first step S1 (S6, S8 and S1).

The control method for the air conditioner may reset the accumulated second total amount value to zero when the second filter sensor unit 54 senses the completion of service of the second filter 4, or when the completion of service of the second filter 4 is input via the input unit 60, and may return to the first step S1 (S7, S8 and S1).

Figure 4:
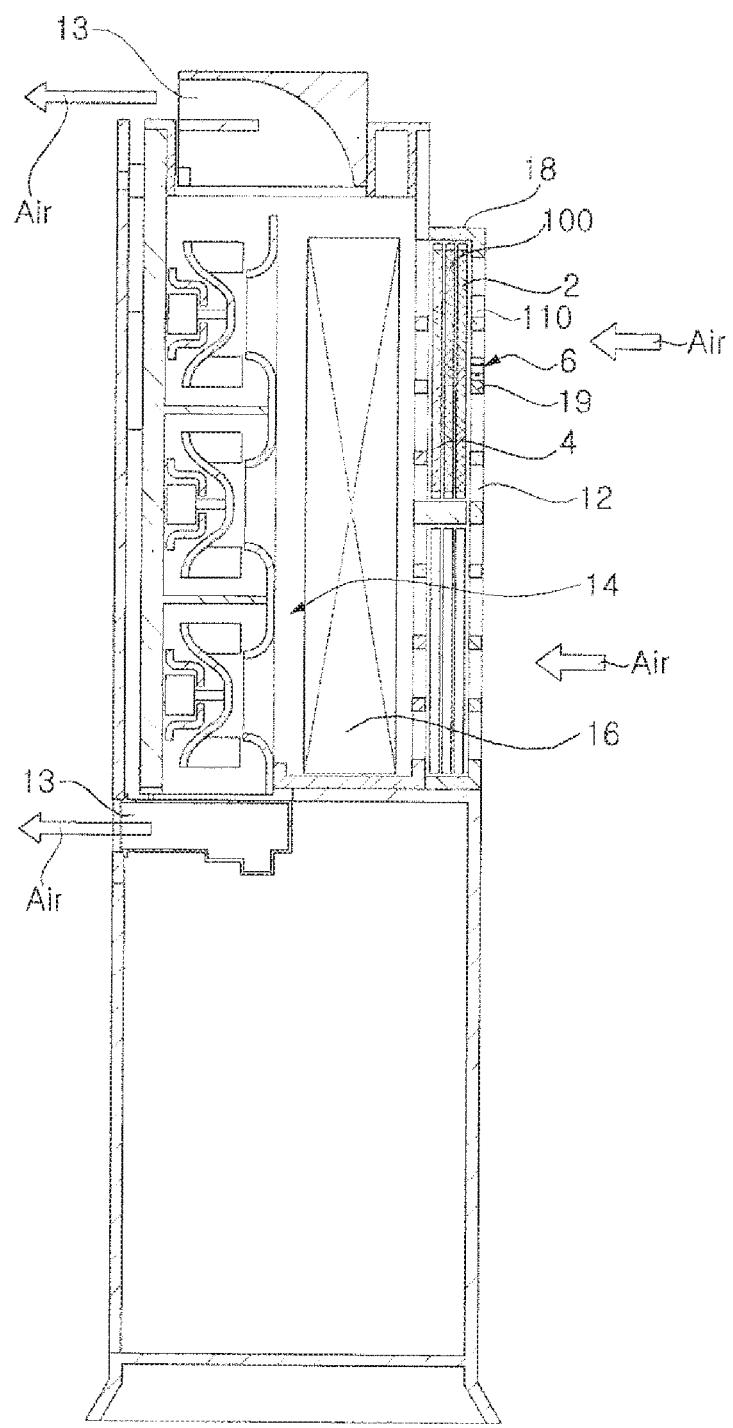
FIG. 4 is a view illustrating a configuration of an air conditioner according to another embodiment of the present invention.
Figure 5:
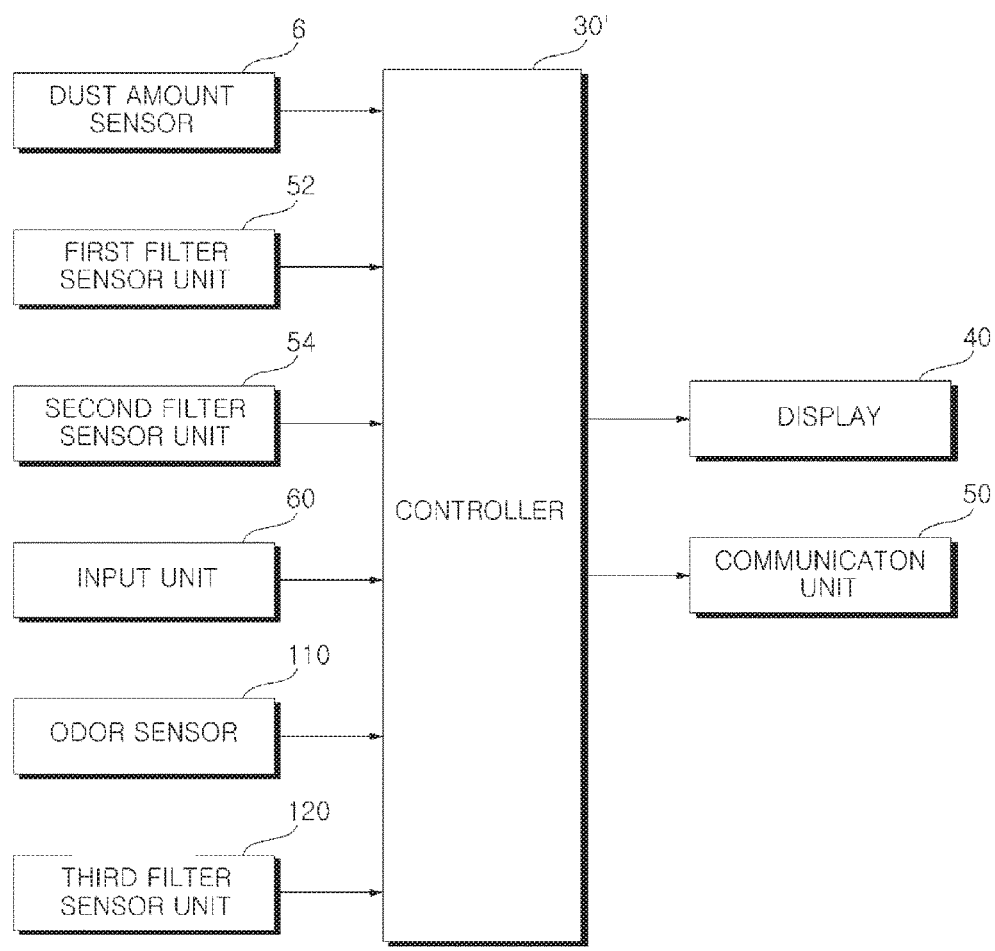
FIG. 5 is a control block diagram of the air conditioner according to the other embodiment of the present invention.

FIG. 4 is a view illustrating a configuration of an air conditioner according to another embodiment of the present invention, and FIG. 5 is a control block diagram of the air conditioner according to the other embodiment of the present invention.

In the present embodiment, the air conditioner may include the first filter 2, the second filter 4, and the dust amount sensor 6, and may further include a third filter 100 located between the first filter 2 and the second filter 4, and an odor sensor 110, which senses the concentration of odor particles in air and transmits a third total concentration amount of odor particles to a controller 30' per unit of time. The controller 30' may output a service signal for the third filter 100 when an accumulated third total concentration amount value exceeds a third set value.

The other configurations and operations of the present embodiment, excluding the third filter 100, the odor sensor 110, and the controller 30', may be the same as or similar to those of the above-described embodiment of the present invention, and a detailed description thereof will be omitted.

The third filter 100 may be a deodorization filter, which filters odor particles in air. The third filter may be located downstream of the first filter 2 in the airflow direction, and may filter odor particles in air that has passed through the first filter 2. The third filter 100 may be, for example, an activated carbon filter.

The odor sensor 110 may be configured as a gas sensor, or may be any one of various sensors selected from among an electro-chemical type, an optical type, an electrical type, and the like. The odor sensor 110 may be located upstream of the first filter 2 in the airflow direction, like the dust amount sensor 6, or may be located between the first filter 2 and the third filter 100 in the airflow direction. The odor sensor 110 may communicate with the controller 30', and may transmit the third total concentration amount of odor particles, measured during a predetermined amount of time, to the controller 30'.

The controller 30' may accumulate the third total concentration amount transmitted from the odor sensor 110, and may not output a service signal for the third filter 100 before the accumulated third total concentration amount value exceeds the third set value. The controller 30' may output the service signal for the third filter 100 when the accumulated value of the third total concentration amount transmitted from the odor sensor 110 exceeds the third set value. When the accumulated third total concentration amount value exceeds the third set value, the controller 30' further outputs the service signal for the third filter 100. Various other controls of the controller 30' may be the same as those of the controller 30 of the above-described embodiment, and a detailed description thereof will be omitted.

The display 40 may be an alarm device that receives the signal from the controller 30' and prompts for the service of the third filter 100. In some embodiments, the speaker (not illustrated) may be an alarm device that prompts for the service of the third filter 100. The display 40 may display information about each of the service of the first filter 2 and the service of the second filter 2. The display 40 may receive the service signal for the third filter 100 and may display information about the service of the third filter 100, independently of the information about each of the service of the first filter 2 and the service of the second filter 2.

The communication unit 50 may receive the service signal for the third filter 100 from the controller 30', and may transmit the service signal for the third filter 100 to an external device. The communication unit 50 may transmit the service signal for the third filter 100, independently of each of the service signal for the first filter 2 and the service signal for the second filter 2.

The input unit 60 may be configured to input information about the completion of service of the third filter 100. The input unit 60 may include a third key, which may be used to indicate the completion of service of the third filter 100.

The user may input information indicating that the service of the third filter 100 is completed via the input unit 60, and the controller 30' may reset the accumulated third total concentration amount value to zero when information indicating the completion of service of the third filter 100 is input via the input unit 60.

The air conditioner may further include a third filter sensor unit 120, which may sense the mounting and separation of the third filter 100.

The third filter sensor unit 120 may output a signal depending on the mounting and separation of the third filter 100 to the controller 30'. The third filter sensor unit 120 may include a switching element, which is switched on when the third filter 100 is mounted and is switched off when the third filter 110 is separated. The controller 30' may judge that the service of the third filter 100 is completed when sensing the mounting of the third filter 100 after sensing the separation of the third filter 100.

The controller 30' may reset the accumulated third total concentration amount value to zero when judging that the service of the third filter 100 is completed based on the signal from the third filter sensor unit 120.

INDUSTRIAL APPLICABILITY

The present invention may be utilized in all air conditioners, such as a cooler, a heater, a chiller, an air purifier, and the like.

The invention claimed is:

1. An air conditioner, comprising:
a first filter for filtering a first particle size range of dust;
a second filter located downstream of the first filter in an airflow direction and filtering a second particle size range of dust less than the first particle size range of dust;
a filter guide to which the first filter and the second filter are detachably coupled, the filter guide forms an air suction port through which air is sucked into the first filter; and
a dust amount sensor located upstream of the first filter in the airflow direction and formed with a hole for passage of dust, the dust amount sensor senses amount of the dust passing through the hole;
wherein the dust amount sensor includes:
a light-emitting element that emits light to the hole;
a first light-receiving element that detects scattered light scattered by dust in the first particle size range of dust passing through the hole;
a second light-receiving element that detects scattered light scattered by dust in the second particle size range of dust passing through the hole;
wherein a suction grill is disposed at the air suction port formed in the filter guide,
wherein the dust amount sensor is mounted to the suction grill.

2. The air conditioner according to claim 1, further comprising a controller for determining a total amount of dust detected by the dust amount sensor,
wherein the dust amount sensor transmits each of a first total amount, which is the amount of dust in the first particle size range passing through the hole detected by the first light-receiving element, and the second total amount, which is the amount of dust in the second particle size range passing through the hole detected by the second light-receiving element, to the controller per unit time,
wherein the controller outputs a service signal for the first filter when the first total amount transmitted from the dust amount sensor exceeds a first set value, and outputs a service signal for the second filter when the second total amount transmitted from the dust amount sensor exceeds a second set value.

3. The air conditioner according to claim 2, further comprising an alarm device configured to receive the signal from the controller and to prompt for service of at least one of the first filter and the second filter.

4. The air conditioner according to claim 3, wherein the alarm device includes a display installed in the air conditioner, and wherein the display independently displays information about service of the first filter and service of the second filter.

5. The air conditioner according to claim 2, further comprising a communication unit configured to receive the signal from the controller and to transmit the service signal for the first filter and the service signal for the second filter to an external device.

6. The air conditioner according to claim 2, further comprising:
a third filter located between the first filter and the second filter; and
an odor sensor configured to sense a concentration of odor particles in air and to transmit a third total amount of the odor particles to the controller per unit of time,
wherein the controller outputs a service signal for the third filter when an accumulated third total amount value exceeds a third set value.

7. The air conditioner according to claim 6, further comprising an alarm device configured to receive the signal from the controller and to prompt for service of the third filter.

8. A control method of controlling the air conditioner of claim 1, the control method comprising:

transmitting, per unit of time, each of a first total amount of dust within the first particle size range and a second total amount of dust within the second particle size range, which is smaller than the first particle size range, among all of dust passing through the hole formed in the dust amount sensor;

outputting a service signal for the first filter when an accumulated first total amount value exceeds a first set value and outputting a service signal for the second filter when an accumulated second total amount value exceeds a second set value; and prompting for service based on the service signal for the first and second filters.

9. The control method according to claim 8, wherein the transmitting includes:

emitting light into the hole;

measuring the amount of dust within the first particle size range based on a pattern of light scattered by the dust within the first particle size range; and measuring the amount of dust within the second particle size range based on a pattern of light scattered by the dust within the second particle size range.

10. The control method according to claim 8, wherein the prompting includes displaying information about service of the first filter or the second filter, in which the accumulated total amount value of dust exceeds the first set value or the second set value, via a display installed in the air conditioner.

11. The control method according to claim 8, wherein the prompting includes transmitting the service signal for the first filter or the service signal for the second filter to an external device.

12. An air conditioner, comprising:

a first filter;

a second filter located downstream of the first filter in an airflow direction;

a dust amount sensor located upstream of the first filter in the airflow direction and formed with a hole for passage of dust, the dust amount sensor being configured to transmit, per unit of time, each of a first total amount of dust within a first particle size range and a second total amount of dust within a second particle size range, which is smaller than the first particle size range, among all of the dust passing through the hole; and a controller configured to output a service signal for the first filter when an accumulated value of the first total amount transmitted from the dust amount sensor exceeds a first set value and to output a service signal for the second filter when an accumulated value of the second total amount transmitted from the dust amount sensor exceeds a second set value, wherein the dust amount sensor is configured to:

emit light into the hole;

measure the amount of dust within the first particle size range based on a pattern of light scattered by the dust within the first particle size range; and measure the amount of dust within the second particle size range based on a pattern of light scattered by the dust within the second particle size range.

13. The air conditioner according to claim 12, further comprising a communication unit configured to receive the signal from the controller and to transmit the service signal for the first filter and the service signal for the second filter to an external device.

14. The air conditioner according to claim 12, further comprising:

a third filter located between the first filter and the second filter; and an odor sensor configured to sense a concentration of odor particles in air and to transmit a third total concentration amount of the odor particles to the controller per unit of time, wherein the controller outputs a service signal for the third filter when an accumulated third total concentration amount value exceeds a third set value.

15. The air conditioner according to claim 14, further comprising an alarm device configured to receive the signal from the controller and to prompt for service of the third filter.

* * * * *